(12) United States Patent
Brakelmann et al.

(10) Patent No.: US 6,249,102 B1
(45) Date of Patent: *Jun. 19, 2001

(54) METHOD OF CONTROLLING A MULTI-AXIS MACHINE TOOL

(75) Inventors: Michael Brakelmann, Wedemark; Ralf Kamieth, Burgwedel, both of (DE)

(73) Assignee: Dr. Johannes Heidenhain GmbH, Traunreut (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,849

(22) PCT Filed: Nov. 29, 1996

(86) PCT No.: PCT/EP96/05289

§ 371 Date: Sep. 21, 1998

§ 102(e) Date: Sep. 21, 1998

(87) PCT Pub. No.: WO97/21155

PCT Pub. Date: Jun. 12, 1997

(30) Foreign Application Priority Data

Dec. 4, 1995 (DE) .............................. 195 45 083

(51) Int. Cl.$^7$ .................................................. G05B 19/10
(52) U.S. Cl. .............. 318/567; 318/568.11; 318/568.23; 318/568.1; 395/92
(58) Field of Search ................................ 318/560–1, 563, 318/565, 567, 568.1, 568.11, 568.13, 568.22, 568.23, 569, 600–607; 901/2, 9, 23, 41; 395/80, 85–92

(56) References Cited

U.S. PATENT DOCUMENTS

| 4,513,379 | | 4/1985 | Wilson et al. . | |
| 5,508,596 | * | 4/1996 | Olsen | 318/567 |
| 5,552,688 | * | 9/1996 | Haga | 318/569 |
| 5,604,677 | * | 2/1997 | Brien | 318/568.19 |
| 5,731,679 | * | 3/1998 | Owens | 318/568.19 |
| 5,880,956 | * | 3/1999 | Graf | 318/568.11 |
| 5,991,510 | * | 11/1999 | Beaulieu | 318/568.13 |

FOREIGN PATENT DOCUMENTS 44 20 598 A1 12/1995 (DE) .
0 063 045 A2 4/1982 (EP) .

OTHER PUBLICATIONS

Patent Abstracts of Japan, vol. 10, No. 106 (P–449), published Apr. 22, 1986, regarding Japanese patent publication 60 238903 A, published Nov. 27, 1985.

* cited by examiner

Primary Examiner—David Martin
(74) Attorney, Agent, or Firm—Brinks Hofer Gilson & Lione

(57) ABSTRACT

A method for the control of a multi-axis machine tool, in particular for the regulation of the position of the individual axes as a function of at least one other axis or external parameters. The method includes providing a coupling function for each axis so that the coupling function can be programmed by the operator of the machine tool and activating the coupling function only after all axes involved in the coupling have been referenced.

33 Claims, 1 Drawing Sheet

METHOD OF CONTROLLING A MULTI-AXIS MACHINE TOOL

Applicants claim, under 35 U.S.C. § 120, the benefit of priority of the filing date of Nov. 29, 1996 of an International patent application PCT/EP96/05289, filed on the aforementioned date, the entire contents of which is incorporated herein by reference. Applicants also claim, under 35 U.S.C. § 119, the benefit of priority of the filing date of Dec. 4, 1995 of a German patent application 195 45 083.3, filed on the aforementioned date, the entire contents of which is incorporated herein by reference.

BACKGROUND OF THE INVENTION

1. Field of the Invention

The invention relates to a method for controlling a multi-axis machine tool.

2. Description of the Related Art

In connection with the control of machine tools, it is necessary to control individual axes as a function of external events, for example the temperature, or of other axes. Known machine tool controls are equipped with the required functions by the manufacturer of the machine tool, or respectively the manufacturer of the control. This means the manufacturer of the controls develops the control in accordance with the actual application case, or, respectively, changes in existing controls must be made by the manufacturer when the purpose of their use is changed.

A result of this is that the customer is required already at the time he places the order for a control to describe the intended application as exactly as possible, or, respectively, he has to contact the manufacturer of the control in case of changes.

It is therefore the object of the invention to recite a method for controlling a machine tool, wherein the user can make an adaptation to the actually prevailing conditions of use within certain limits.

BRIEF SUMMARY OF THE INVENTION

In accordance with the invention, a coupling function is provided for each one of the axes of a machine tool, which can be programmed by the operator.

In an embodiment of the invention, the execution of the coupling function is blocked here until all axes involved in the coupling have been referenced, i.e. until at least the positions of the involved axes or their relative position in relation to each other has been determined.

The method in accordance with the invention has the advantage that the final user of a machine tool can still affect the control of the machine tool. Because of this it is possible to make changes in the requirements of the machine tool rapidly and flexibly at the location of the machine. Protection from damage in the course of processing workpieces by the machine tool is achieved in that all axes involved in a coupling function must be defined in respect to their position before the coupling function can be performed.

In accordance with an advantageous embodiment of the invention the coupling function of each axis is constructed from a predeterminable number of basic operations. It has been shown to be sufficient to set the number of basic operations at ten, wherein the number can become greater or lesser, depending on the intended use.

Each basic operation has at least one source operand and one target operand and contains an operator. Functional connections between different axes or dependencies from predetermined external variables or constant values, for example master-slave-relationships or temperature dependencies, can be programmed in a simple manner by the user in this way. Higher order functions can be realized by two or more individual basic operations.

A further advantageous embodiment of the invention provides that each basic function is defined by means of two parameters. The first parameter contains the source operands, a target operand and the operator. The second parameter contains a direct input value for a source operand. If no direct input value for the basic operation exists, the second parameter is set to zero.

The invention will be explained in what follows by means of the drawing figure.

BRIEF DESCRIPTION OF THE DRAWINGS

The sole drawing figure represents a block diagram which indicates how the coupling function is installed in the control of the machine tool.

DESCRIPTION OF THE PREFERRED EMBODIMENTS

Figure 1:
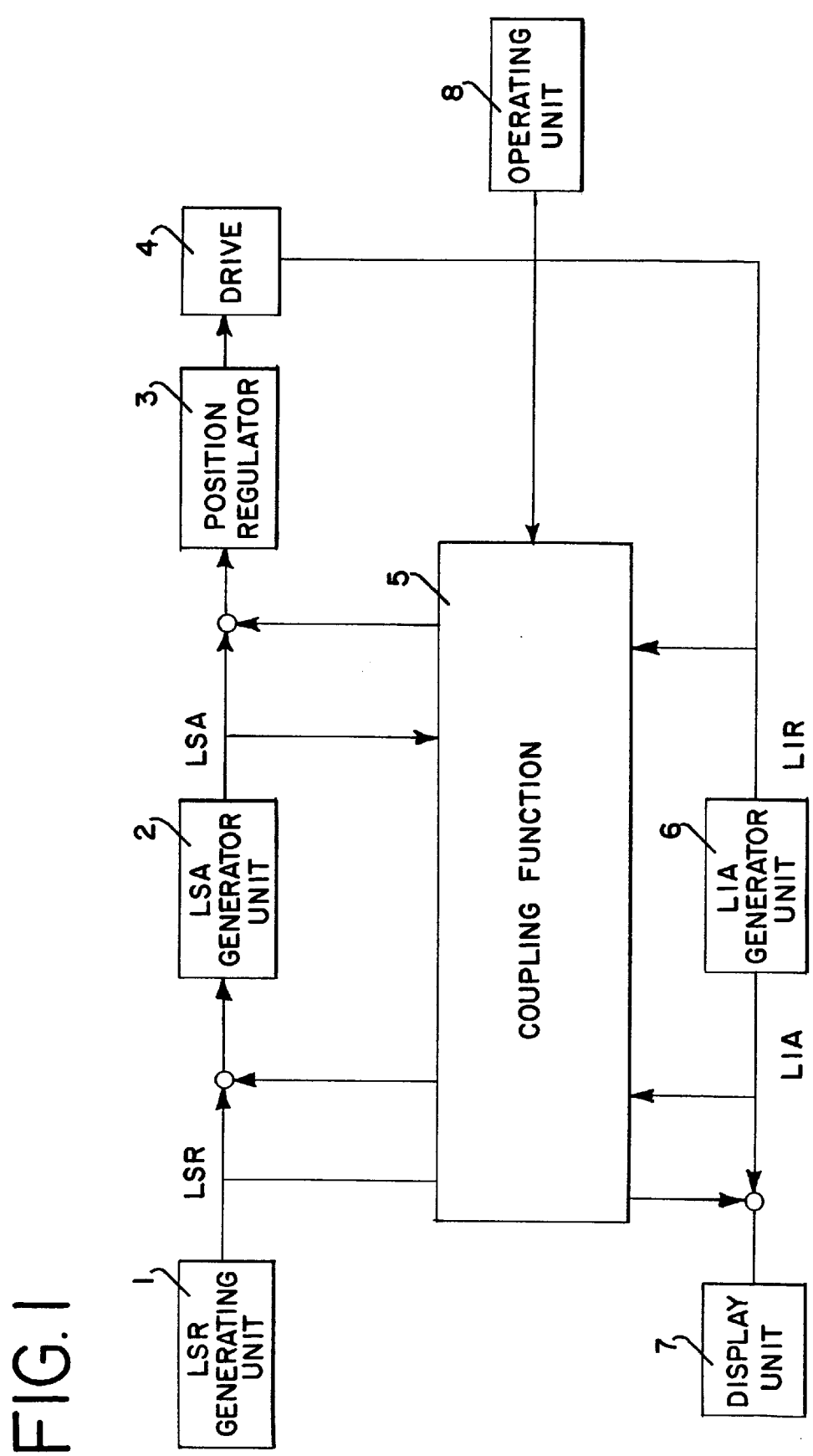

The function block 5 of FIG. 1, which indicates the coupling function, represents a functional relationship between the actual position values and the position set values. The coupling functions are input via an operating unit 8.

Relative set values LSR for controlling an axis are generated in unit 1, which is a part of the machine tool control. These relative set values are converted into absolute set values LSA in unit 2 and output to a position regulator 3, which triggers a drive 4. Relative actual position values LIR are obtained from the movements of the drive, which are converted into absolute actual position values LIA in a unit 6. Machine- and program-related data are displayed in a display unit 7.

Relationships between sequential position set values, actual position values, and position set values or dependencies of position set values from direct or variable values, which are input for the special application case by the user, are realized by the coupling function 5.

The possibilities of employing the coupling functions will be explained by means of simple examples in what follows.

A frequently occurring application case is temperature compensation.

In connection with temperature compensation, absolute position set values, i.e., position values which are referred to the absolute zero point of the machine, are used.

The following equation applies in linear temperature compensation:

$$L_{soll} = T_{koeff} * L_{esoll}$$

In this case, $L_{esoll}$ is the absolute position set value output by the unit 2, $T_{koeff}$ indicates the coefficient of temperature, and $L_{soll}$ identifies the position set value issued to the position regulator.

The basic operation looks like this:

| | Parameter 1 | | | | |
|---|---|---|---|---|---|
| Basic Operation | Target Operand | Source Operand 1 | Source Operand 2 | Operator | Parameter 2 Value |
| 1 | $L_{soll}$ | $L_{esoll}$ | $T_{koeff}$ | Multi-plication | |

In the present case the coupling function consists of a single basic operation, which is defined by means of a parameter.

This first parameter contains the target operand, two source operands and one operator. The second parameter is unoccupied, since the basic operation does not contain a direct input value, i.e., no constant coefficient. The coefficient of temperature is read out of a variable register, whose address is indicated in the source operand 2.

In a preferred embodiment, the parameter 1 consists of a data word of a length of 32 bits, i.e., 4 bytes.

Byte 0 indicates the target operand, byte 1 the source operand 1, byte 2 the source operand 2 and byte 3 the operator.

The assignment of a byte takes place by the specification of a decimal value in the range of between 0 and 255.

A further example of the application is the master-slave coupling, wherein the logical axis 1 as the slave axis follows the movement of the logical axis 2.

In this coupling the relative position values, i.e., the distances travelled by the axes involved during the last work cycle, are brought into a relationship with each other. As in the case of the temperature compensation, the coupling function has a single basic function, which is constructed as follows:

| | Parameter 1 | | | | Parameter 2 |
|---|---|---|---|---|---|
| Basic Operation | Target Operand | Source Operand 1 | Source Operand 2 | Operator | Value |
| 1 | $L_{sr1}$ | $L_{sr2}$ | "direct" | Multiplication | const. |

The relative set position value of the axis 1 is indicated by $L_{sr1}$, the relative set position of the axis 2 by $L_{sr2}$, and a direct coupling factor between the axes is identified by "direct".

Since the coupling factor is a direct input value, the parameter 2, which contains the value of the coupling factor, is also occupied.

An example for a coupling function with two basic operations is described in what follows by means of a temperature compensation with a temperature offset value.

This temperature compensation is based on the equation $$L_{soll}=T_{koeff}*L_{esoll}+T_{const}$$

The coupling function appears as follows:

| | Parameter 1 | | | | Parameter 2 |
|---|---|---|---|---|---|
| Basic Operation | Target Operand | Source Operand 1 | Source Operand 2 | Operator | Value |
| 1 | Var1 | $L_{esoll}$ | $T_{koeff}$ | Multiplication | — |
| 2 | $L_{soll}$ | Var1 | "direct" | Addition | const. |

In the first basic operation, a variant Var1 is calculated as the target operand, which results from the multiplication of the coefficient of temperature $T_{koeff}$ and the position set value predetermined by the control. In the second basic operation, the position set value issued to the position regulation is calculated, which results from the addition of the variable Var1 and a direct input value, which indicates the temperature offset.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed is:

1. A method for the control of the position of an individual axis of a multi-axis machine tool, comprising:
    controlling the position of an individual axis of a multi-axis machine tool based on one or more functional relationships of at least one other axis or of external parameters, wherein each of said one or more functional relationships defines a coupling function;
    programming said coupling functions by an operator of said multi-axis machine tool; and
    wherein said controlling the position of an individual axis begins only after all absolute or relative axis positions are determined.

2. The method of claim 1, wherein one of said coupling functions comprises a master-slave relationship between said individual axis and a second axis of said multi-axis machine so that said individual axis is controlled as a function of said second axis.

3. The method of claim 1, wherein one of said coupling function depends on a temperature.

4. The method of claim 1, wherein one of said coupling function comprises a basic operation that is defined by a parameter.

5. The method of claim 1, wherein one of said coupling function is linear.

6. The method of claim 1, wherein one of said coupling functions is $L_{soll}=T_{koeff}*L_{esoll}$, wherein $L_{soll}$ is the absolute position set value of said individual axis, $T_{koeff}$ is the coefficient of temperature and $L_{esoll}$ is the position set value of said individual axis.

7. The method of claim 1, wherein one of said coupling functions is $L_{soll}=T_{koeff}*L_{esoll}+T_{const}$, wherein $L_{soll}$ is the absolute position set value of said individual axis, $T_{keoff}$ is the coefficient of temperature, $L_{esoll}$ is the position set value of said individual axis and $T_{const}$ is a temperature offset value.

8. A method for the control of the position of an individual axis of a multi-axis machine tool, comprising:
    controlling the position of an individual axis of a multi-axis machine tool based on one or more functional relationships of at least one other axis or of external parameters, wherein each of said one or more functional relationships defines a coupling function;
    programming said coupling functions by an operator of said multi-axis machine tool; and
    wherein said controlling the position of an individual axis begins only after all absolute or relative axis positions are determined; and
    wherein at least one of said coupling functions of said individual axis is constructed from a predetermined amount of basic operations, wherein each basic operation contains at least one source operand, one target operand and an operator.

9. The method of claim 8, wherein each basic operation is defined by a first parameter and a second parameter, wherein said first parameter contains said at least one source operand, target operand and operator, and said second parameter contains a direct input value for a second source operand or is set to zero, if no direct input value exists.

10. The method of claim 9, wherein one of said basic operations comprises:
    a source operand represented in a first byte of a data word;
    a target operand represented in a second byte of said data word; and
    an operator represented in a third byte of said data word.

11. The method of claim 10, wherein said operator represented in said third byte of said data word is multiplication.

12. The method of claim 11, wherein said target operand represented in said second byte of said data word is $L_{soll}$, the absolute position set value of said individual axis and said source operand represented in said first byte of said data word is either $T_{koeff}$ the coefficient of temperature or $L_{esoll}$ the position set value of said individual axis.

13. The method of claim 11, wherein said target operand represented in said second byte of said data word is $L_{sr1}$, the relative set position of said individual axis and said source operand represented in said first byte of said data word is either $L_{sr2}$ the relative set position of a second axis of said multi-axis machine or a direct coupling factor between said individual and second axes.

14. The method of claim 10, wherein said operator represented in said third byte of said data word is addition.

15. The method of claim 14, wherein said target operand represented in said second byte of said data word is $L_{soll}$, the absolute position set value of said individual axis and said source operand represented in said first byte of said data word is either the multiplication of a coefficient of temperature $T_{koeff}$ with $L_{esoll}$ the position set value of said individual axis or a direct coupling factor between said individual axis and a second axis of said multi-axis machine.

16. The method of claim 8, wherein one of said basic operations comprises:
    a source operand represented in a first byte of a data word;
    a target operand represented in a second byte of said data word; and
    an operator represented in a third byte of said data word.

17. The method of claim 16, wherein said operator represented in said third byte of said data word is multiplication.

18. The method of claim 17, wherein said target operand represented in said second byte of said data word is $L_{soll}$, the absolute position set value of said individual axis and said source operand represented in said first byte of said data word is either $T_{koeff}$ the coefficient of temperature or $L_{esoll}$ the position set value of said individual axis.

19. The method of claim 17, wherein said target operand represented in said second byte of said data word is $L_{sr1}$, the relative set position of said individual axis and said source operand represented in said first byte of said data word is either $L_{sr2}$ the relative set position of a second axis of said multi-axis machine or a direct coupling factor between said individual and second axes.

20. The method of claim 16, wherein said operator represented in said third byte of said data word is addition.

21. The method of claim 20, wherein said target operand represented in said second byte of said data word is $L_{soll}$, the absolute position set value of said individual axis and said source operand represented in said first byte of said data word is either the multiplication of a coefficient of temperature $T_{koeff}$ with $L_{esoll}$ the position set value of said individual axis or a direct coupling factor between said individual axis and a second axis of said multi-axis machine.

22. The method of claim 8, wherein one of said coupling functions comprises a master-slave relationship between said individual axis and a second axis of said multi-axis machine so that said individual axis is controlled as a function of said second axis.

23. The method of claim 8, wherein one of said coupling functions depends on a temperature.

24. The method of claim 8, wherein one of said coupling functions comprises a basic operation that is defined by a parameter.

25. The method of claim 8, wherein one of said coupling functions is linear.

26. The method of claim 8, wherein one of said coupling functions is $L_{soll} = T_{koeff} * L_{esoll}$, wherein $L_{soll}$ is the absolute position set value of said individual axis, $T_{koeff}$ is the coefficient of temperature and $L_{esoll}$ is the position set value of said individual axis.

27. The method of claim 8, wherein one of said coupling functions is $L_{soll} = T_{koeff} * L_{esoll} + T_{const}$, wherein $L_{soll}$ is the absolute position set value of said individual axis, $T_{koeff}$ is the coefficient of temperature, $L_{esoll}$ is the position set value of said individual axis and $T_{const}$ is a temperature offset value.

28. The method of claim 8, wherein one of said basic operations comprises:
    a source operand represented in a first byte of a data word;
    a target operand represented in a second byte of said data word; and
    an operator represented in a third byte of said data word.

29. The method of claim 28, wherein said operator represented in said third byte of said data word is multiplication.

30. The method of claim 29, wherein said target operand represented in said second byte of said data word is $L_{soll}$, the absolute position set value of said individual axis and said source operand represented in said first byte of said data word is either $T_{koeff}$ the coefficient of temperature or $L_{esoll}$ the position set value of said individual axis.

31. The method of claim 29, wherein said target operand represented in said second byte of said data word is $L_{sr1}$, the relative set position of said individual axis and said source operand represented in said first byte of said data word is either $L_{sr2}$ the relative set position of a second axis of said multi-axis machine or a direct coupling factor between said individual and second axes.

32. The method of claim 28, wherein said operator represented in said third byte of said data word is addition.

33. The method of claim 32, wherein said target operand represented in said second byte of said data word is $L_{soll}$, the absolute position set value of said individual axis and said source operand represented in said first byte of said data word is either the multiplication of a coefficient of temperature $T_{koeff}$ with $L_{esoll}$ the position set value of said individual axis or a direct coupling factor between said individual axis and a second axis of said multi-axis machine.

* * * * *

UNITED STATES PATENT AND TRADEMARK OFFICE
CERTIFICATE OF CORRECTION

PATENT NO. : 6,249,102 B1  Page 1 of 1
DATED : June 19, 2001
INVENTOR(S) : Michael Brakelmann et al.

It is certified that error appears in the above-identified patent and that said Letters Patent is hereby corrected as shown below:

<u>Column 4,</u>
Line 20, delete "function" and substitute -- functions -- in its place.
Line 22, delete "function" and substitute -- functions -- in its place.
Line 24, delete "function" and substitute -- functions -- in its place.
Line 59, delete "claim 9," and substitute -- claim 8, -- in its place.

Signed and Sealed this

Twenty-ninth Day of October, 2002

*Attest:*

*Attesting Officer*

JAMES E. ROGAN
*Director of the United States Patent and Trademark Office*